Figure 1:
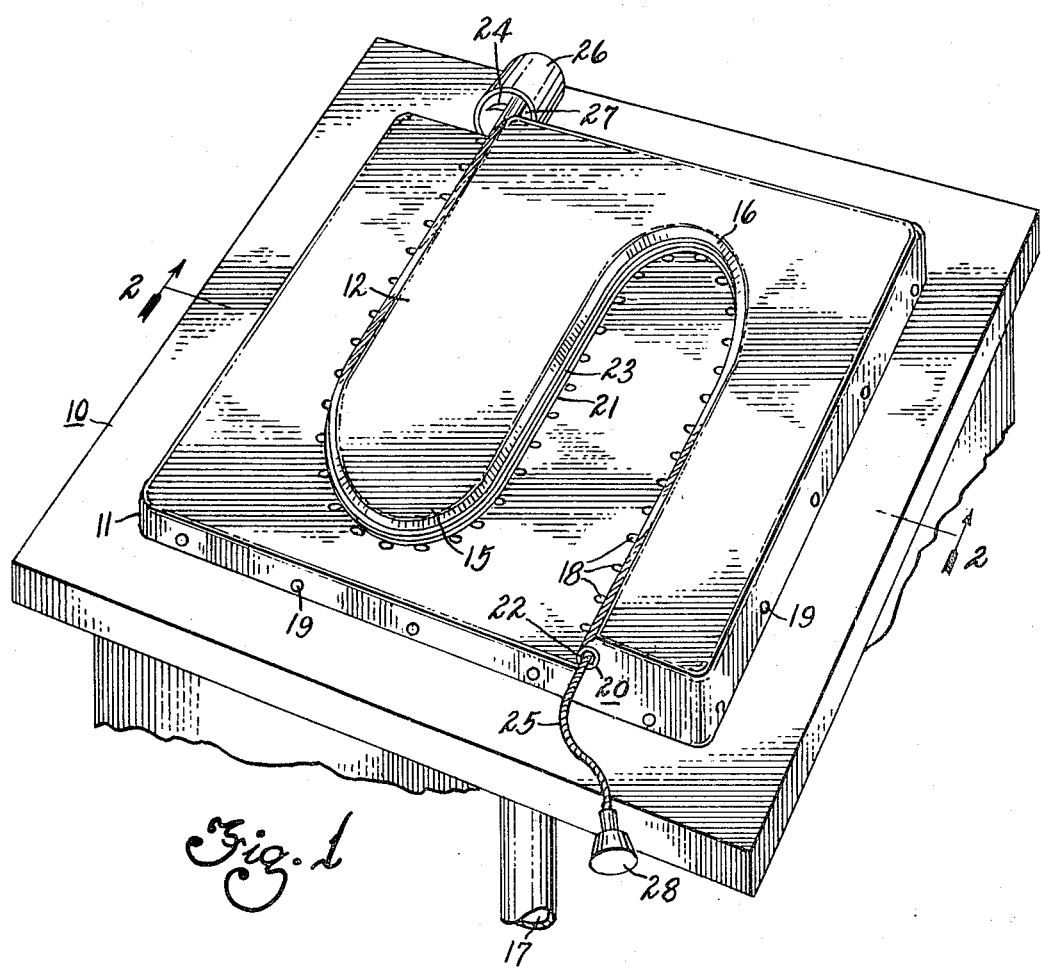

Dec. 27, 1966     J. E. WADLINGER     3,294,881
DIFFERENTIAL PRESSURE FORMING AND TRIM OPERATIONS
Filed Nov. 29, 1963     3 Sheets-Sheet 1

INVENTOR.
JOSEPH E. WADLINGER
BY
HIS ATTORNEY

Dec. 27, 1966  J. E. WADLINGER  3,294,881
DIFFERENTIAL PRESSURE FORMING AND TRIM OPERATIONS
Filed Nov. 29, 1963  3 Sheets-Sheet 2
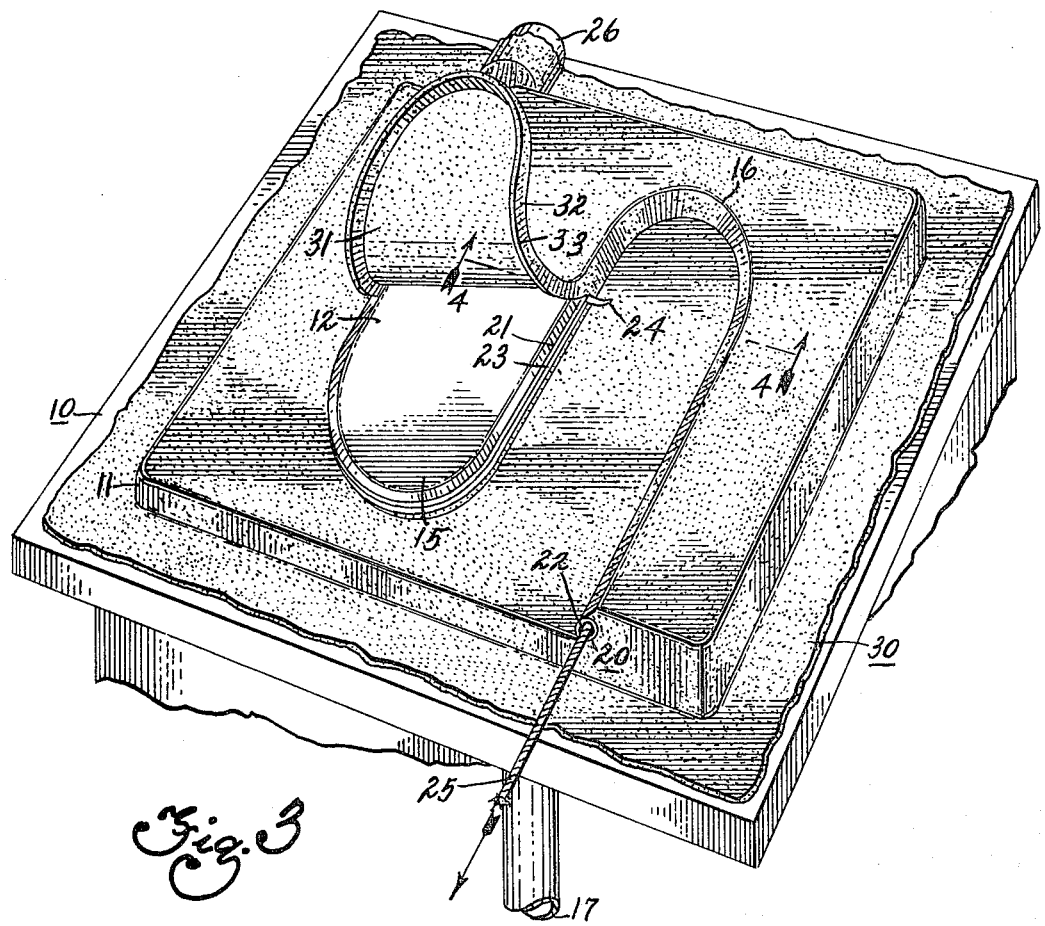
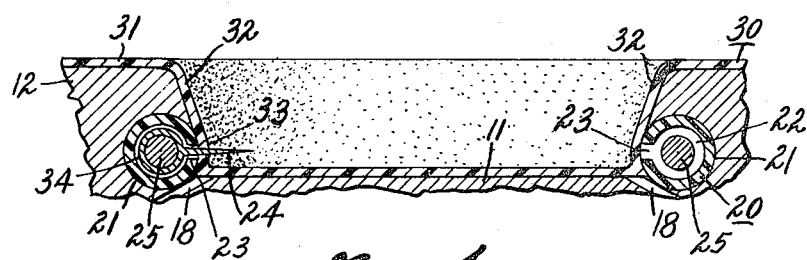
INVENTOR.
JOSEPH E. WADLINGER
BY
HIS ATTORNEY

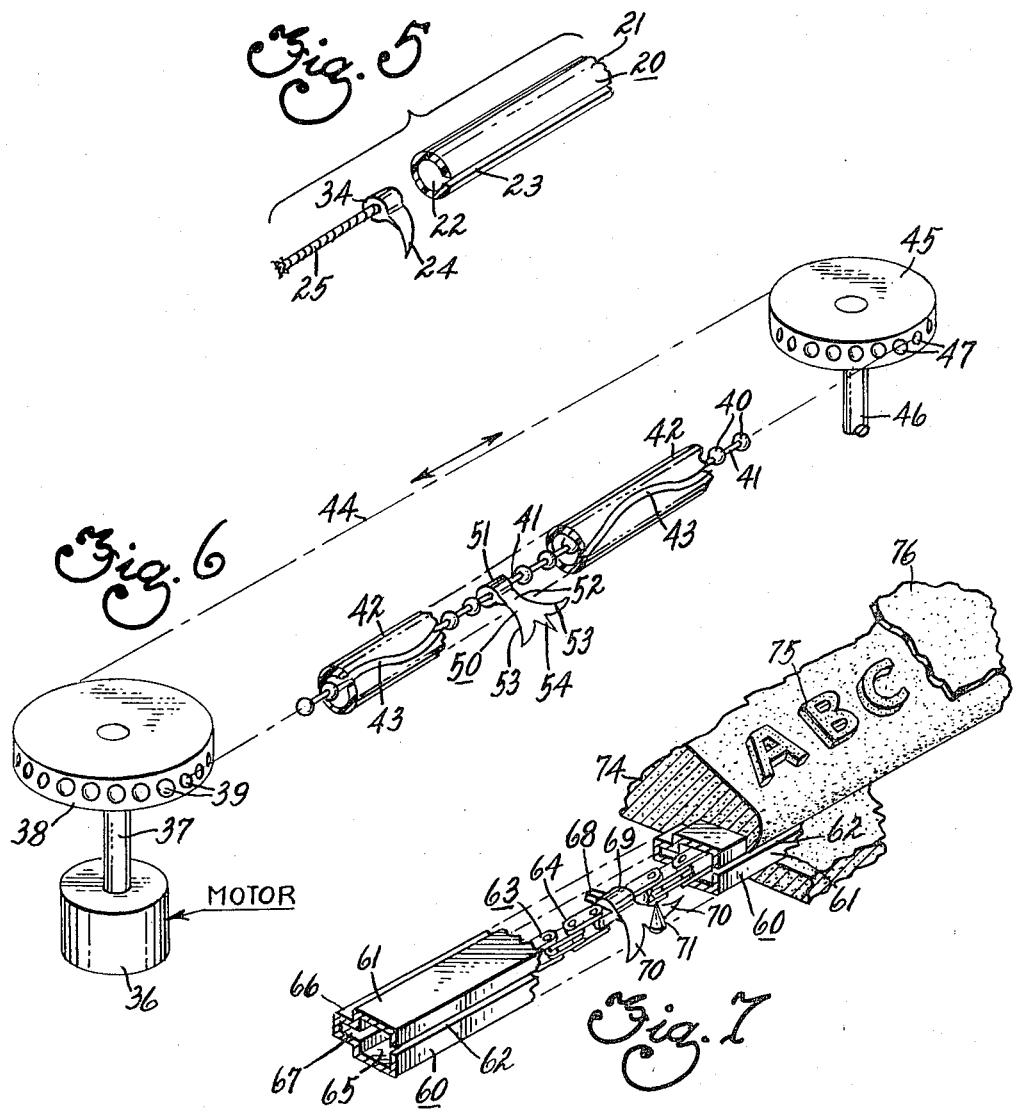

United States Patent Office 3,294,881
Patented Dec. 27, 1966

3,294,881
DIFFERENTIAL PRESSURE FORMING AND TRIM OPERATIONS
Joseph E. Wadlinger, Dayton, Ohio, assignor to General Motors Corporation, Detroit, Mich., a corporation of Delaware
Filed Nov. 29, 1963, Ser. No. 326,739
19 Claims. (Cl. 264—92)

This invention relates to forming of material to be predetermined configuration, and, more particularly, to trimming of edges efficiently and effectively.

Cost of die stamping components and labor for manual cutting operations along edging of material have been alternatives each with associated problems such as maintenance and time. The present invention permits avoidance of considerable money expenditure for tooling of die stamping components and gains also a savings in time of benefit regardless of manual as well as motorized application of a new method and apparatus for trim cutting of material edging in irregular paths though guided accurately as an object of the present invention.

Another object of this invention is to provide procedure including steps of forming material into multi-dimension configuration by use of differential pressure applied using an inexpensive forming buck or support with a peripheral channel slotted to guide a cutting member complementary therewith, moving the cutting member for instantaneous and continuous material edge trimming regardless of shape and irregular contours, and removing the material made to pattern without need for hard dies and/or scissors cutting.

Another object of this invention is to provide trimming equipment in combination with a differential pressure forming means including a multi-dimensional body portion for contouring and a peripheral channel portion slotted to guide a cutting member movable along a predetermined path regardless of shape and irregular curved contour for instantaneous edged trimming of the material in accordance with pattern established by the slotted channel portion.

A further object of this invention is to provide an edge trimming device for use during differential pressure forming of material and including a channel portion slotted continuously to one side thereof in a predetermined multi-directional path, a flexible force-transmitting means confined to be movable through the channel portion in accordance with power exerted thereon as to cable or bead chain for example, and a cutting member carried by the flexible force-transmitting means and having at least one cutting blade thereof projecting outwardly from the slotted channel portion progressively into engagement with the material being cut.

Another object of this invention is to provide edge trimming apparatus including a base having pressure-differential aperturing in a predetermined path and communicating therethrough, and irregularly contoured buck or pattern on the base and located to one side of the aperturing path, a flexible force-transmitting means traversable within the channel-forming means under mechanization such as gearing, friction drive and the like powered manually or motorized, and a cutting member carried by the flexible force-transmitting means and having an initial material-piercing adaptation though movable quickly and continuously for material edge cutting in a predetermined path determined by the slotted channel-forming means from which the cutting member projects and is guided.

Further objects and advantages will become apparent from the following description, reference being had to the drawings wherein preferred embodiments of the present invention are clearly shown.

Figure 2:
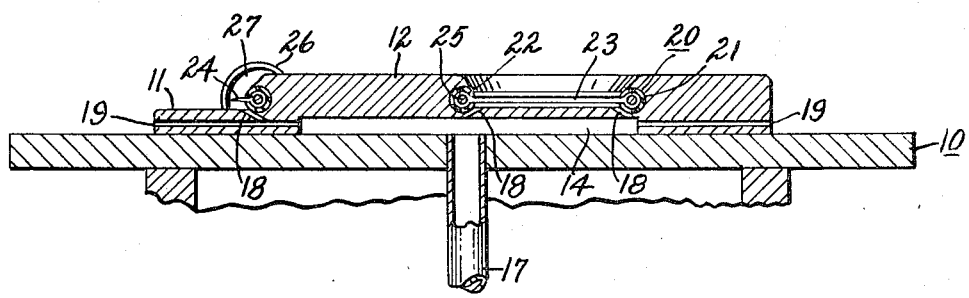

In the drawings:
FIGURE 1 is a perspective illustration of combination equipment prepared for operation in accordance with the present invention.
FIGURE 2 is a cross-sectional view taken along line 2—2 in FIGURE 1.
FIGURE 3 illustrates the equipment of FIGURE 1 with a cutting member progressively moving for material edge trimming in accordance with the present invention.
FIGURE 4 is a cross-sectional view taken along line 4—4 in FIGURE 3.
FIGURE 5 is a fragmentary perspective illustration of a flexible force-transmitting means and blade portion carried thereby for traversing a slotted channel guide on a forming device in accordance with the present invention.
FIGURE 6 is a diagrammatic showing of mechanized and motorized powering of equipment in accordance with the present invention.
FIGURE 7 is a fragmentary perspective view of another channel guide and driven blade portion for use in accordance with the present invention.

In FIGURE 1 there is shown a base or support means generally indicated by numeral 10 on which a forming buck, pattern or bottom portion 11 is mounted to include a contoured as well as curved raised portion 12 that can follow any predetermined configuration. Along an underside of the buck or pattern portion 11–12 there is a recess or cavity 14 that can be seen in the view of FIGURE 2. The pattern to be formed can include any number of complex bends or curves such as represented by numerals 15 and 16 in FIGURE 1. It is to be understood that the complete pattern or buck forming means can establish a three dimensional covering of insulating material such as flexible plastics, leather and the like usable as a covering for vehicle dashboard assemblies as disclosed further in a patent, 3,042,137, Mathues et al., issued July 3, 1962, and belonging to the assignee of the present invention. Another patent, 3,088,539, Mathues et al., issued May 7, 1963, to the assignee of the present invention, also shows such dashboard assemblies though it is to be noted that principles of the present invention can be applied wherever an irregular or curved configuration is to be formed and trimmed with a minimum effort.

Thus the curves 15 and 16 illustrated in FIGURE 1 of the drawings are merely representative of complex patterns which can be readily formed and trimmed in accordance with the present invention. A conduit or pipe 17 represented in views of FIGURES 1, 2 and 3 can be fitted to the base or support 10 in a location to provide communication with the recess, chamber or cavity 14. Connection of this conduit or pipe 17 to a vacuum-forming means can establish a differential pressure relationship as to fluid or pneumatic pressure above the buck or pattern 12 where contoured as well as the bottom portion 11 thereof subject to provision of a plurality of passages or apertures 18 which are located along lower edging of a juncture between the bottom portion 11 and contoured pattern or buck 12. Optional additional passages 19 can be provided laterally outwardly from the cavity or recess 14.

Also along the juncture of the bottom portion 11 and pattern or buck portion 12 and immediately adjacent to though slightly above the apertures or passages 18 there is provided a channel forming means generally indicated by numeral 20 including a body portion 21 thereof which is fitted and recessed laterally into the buck or pattern portion 12 so as to leave a hollow interior 22 of the channel forming portion having a lateral slot or opening 23 extending therefrom peripherally in a predetermined path traversable by a cutting or blade means 24 carried by a force transmitting means, flexible cable or pull-chain portion 25. The blade or cutting portion 24 projects through the lateral slot 23 and can be positioned initially in a tubular portion 26 having an opening 27 at one end thereof as represented in views of FIGURES 1 and 2. The cable or force transmitting means 25 can be provided with a knob 28 shown in FIGURE 1 or can be motorized as described subsequently herein.

In FIGURE 3 a flexible plastic or leather covering material generally indicated by numeral 30 has been subjected to differential pressure forming such as by providing a vacuum in the chamber or recess 14 noted earlier. The covering 30 can now include an upper portion 31 as well as downwardly extending and integral sides 32 subject to quick and clean trimming of a lower edge 33 thereof due to progressive passage of the force transmitting means or cable 25 along the path determined by the tube or channel body portion 21 subject to projection of the blade or cutter portion 24 through the side slot 23 as shown in the drawings. It is to be noted that the diameter of the force transmitting means, cable or beadchain such as represented by numeral 25 is to be larger than widths or size of the opening or slot 23. It is to be understood that the blade or cutting portion 24 can terminate in a sharp point for piercing purposes into the flexible sheet material 30 upon emergence from a particular location such as the open end 27 of the tube portion 26. The blade 24 can have an annular portion 34 crimped or tightly fitted around the force transmitting means 25 as shown in FIGURE 4. The tube or channel body portion 21 can be made of suitable metal or of a wear-resisting molded plastic material such as acetal, resin and other heat-resistant and stable materials. It is to be noted that the progressive movement of the cutting or blade portion 24 as illustrated in views of FIGURES 3 and 4 will result in a clean and continuous edging 33 which can be substantially parallel to the top portion 31 of the covering material 30. Also it is to be understood that the cutting blade portion 24 can be caused to move in opposite directions. In FIGURE 5 there is a fragmentary exploded representation of the force transmitting means 25 carrying the cutter or blade portion 24 and adapted to move axially along the chamber means 20 having the slot 23 therein. The blade portion 24 extends radially outwardly from the force transmitting means 25 for a distance greater than total width of the channel forming means 20. It is to be noted that the passage 22 in the channel forming means 20 is shown with a round cross section though any other cross section such as squared, hexagonal and the like could also be used.

Further modifications of differential pressure forming and trim operations can include provision of a motor means 36 suitably energizable and having a shaft 37 projecting therefrom to carry a sprocket, gearing or pullylike member 38 which can be provided with suitable teeth or cavitaies 39 in which beads or ball portions 40 can fit complementary in spaced relationship established by links or connecting portions 41. It is to be understood that in place of the balls or beads 40 and links 41 an actual link-chain can be used depending on the size and shape of the passage defined by a tube or channel used with the forming buck or pattern portion. Such channel portion can also be modified to have a body 42 with a hollow interior and an irregularly extending slot 43 as represented in FIGURE 6. It is to be understood that the bead or chain means for forced transmitting purposes can transverse a closed loop path 44 of any predetermined shape and additional idler wheels or sprockets 45 journaled suitably by a shaft means 46 can be provided in accordance with overall contouring and trimming to be accomplished. The idlers such as 45 can have suitable recessing 47 as well as other peripheral configuration including teeth and the like for engaging a ball chain or other force transmitting means utilized for traversing the closed loop path 44.

The cutter or blade means generally indicated by numeral 50 in FIGURE 6 can have a mounting end portion 51 fitted to a link 41 as well as a shank portion 52 which traverses the irregular path of the slot 43 subject to cutting of flexible plastic sheet material such as vinyl and the like that can be accomplished by opposite blade portions 53 as well as an optional intermediate barb or piercing poriton 54.

FIGURE 7 illustrates a further modification of the channel forming means indicated generally by numeral 60 and including a main body portion 61 as well as a slot or lateral opening 62. A chain means 63 having pivotal links 64 can pass through an inner recess 65 having a squared configuration as well as a lateral extension 66 having a groove 67 therein engageable by a projection 68 carried by a mounting portion 69 of blade or cutter means 70. The projection 68 traverses and engages the groove 67 for stabilization purposes. The groove 67 can be located remote from the slot or opening 62 and can optionally be provided with irregular path configuration to coincide with any irregular path of the slot or opening 62 if such is provided in accordance with the irregular path such as 43 shown by the slot of that number in FIGURE 6. A barb 71 can be provided to extend transversally of the blade or cutter means 70 in a location outside the chanenl forming means 60. Such a barb 71 can provide initial piercing.

The forming and trimming means in accordance with the present invention obviates need for use of scissors by an operator. Such scissors cutting as previously required was time consuming and often unsatisfactory so far as accuracy is concerned. Also the forming and trimming operation in accordance with the present invention can eliminate use of hard mating dies of large and irregular configuration for special applications such as dashboard coverings and the like. Furthermore, the contouring of relatively soft covering materials can be readily accomplished in the differential pressure forming operation more accurately than with telescoping or complementary die portions which could not provide accurate trimming particularly for irregular shapes and contours as to curves, corners and raised portions encountered in a crash pad or vehicle instrument panel. The tube or channel means can be readily embedded peripherally along edging of the forming buck or pattern position. This tube or channel means with the elongated and continuous slot therein can complement the forming buck or pattern portion and can provide the predetermined location for a desired trim line. Use of a flexible cable or chain with a small knife or blade portion carried thereby can effect a quick and instantaneous trimming and cutting operation once the flexible material is vacuum formed into position. It is to be understood that a steam heating or softening can precede the actual vacuum forming of the soft plastic or covering material to enhance complex multi-dimensional contour forming. The force transmitting means or cable can be readily forced to move through the tube or channel such that the knife or cutting portion readily trims and separates the contoured portion of the cutting material into a predetermined shape and size. The trimming operation can be accomplished in any plane by procedure and apparatus in accordance with the present invention. Thus it is to be understood that not only horizontal as well as vertical trimming edges can be formed but also any irregular trim cuts can be made in a quick and clean manner.

It is to be understood that the features of the present invention for differential pressure forming edging and trimming operations can be applied to various buck or pattern portions made of metal or of wood having the passages 18 therein. Also the buck or pattern portion could be made of a silicon or sand particle means 74 indicated in FIGURE 7 having an epoxy resin therewith for abrasion resistance and for setting the particles into a predetermined shape. Such resin-sand means 74 can be sufficiently porous for vacuum forming directly therethrough and for accurately defining letters of a vehicle name and the like as indicated by numeral 75 in FIGURE 7 such that a covering material 76 can be contoured and vacuum formed to include an embossed model name and the like. Such porous buck or pattern forming material of resin-sand can be used not only for vacuum forming but also for blow molding, extrusion casting, venting of rubber or elastomeric molds as well as foaming of crash pad molds with vacuum holding fixtures and the like. Reference can be made to a U.S. Patent 2,846,-742, Wagner, issued August 12, 1958, on a pattern and method of molding per se using an epoxy resin composition with sand though completely lacking features of the present invention.

It is to be noted that the forming and trim operations in accordance with the present invention can also be used to advantage to form a sealing edge on a lip seal to have a clean and sharp knife edging evenly along one side of an annular member such as can be used as a seal in a brake cylinder. Thus any sealing edge for appearance or otherwise can be formed or cut parallel to any main surface depending upon sharpness of bend of the tube or channel guide means and requiring no die structures which could not provide any finish cut parallel to any formed surface. It is to be understood that a gear train as well as a mechanized chain and flexible drive can be adapted to follow any predetermined path and that the lateral opening or slot such as 23 and 43 as well as 62 can be positioned radially or scalloped. The suitable camming could be provided in a predetermined location for initial piercing or for a particularly sharp bend. In addition to the positive drive and motorized operation noted, the manual application of force as well as a friction drive on the cable or force transmitting means could be provided. The components of the combination pressure forming and trim apparatus are relatively inexpensive to provide and maintain with a completed trimming operation requiring a fraction of a minute and a fraction of the time and effort previously expended by use of scissors manually used on dashboard covering material for periods of up to a half hour or more in some instances. Regardless of the irregular path of forming and trimming operations, the knife or blade portion can be kept from unwanted movement due to retention thereof by channel means having the guiding slot as well as the optional stabilizing groove therewith. It is to be noted that the knife or cutting portion can be caused to move reciprocally or to and fro and for such operation the double cutting edge shown in FIGURES 6 and 7 can be provided for such a function. Also the double-edged cutting portion can be used for the closed-loop path of FIGURE 6 such that regardless of direction of energization of the motor means 36 there is an effective trimming operation in accordance with the present invention.

While the embodiments of the present invention as herein disclosed constitute preferred forms, it is to be understood that other forms might be adopted.

What is claimed is as follows:

1. In combination, a differential pressure forming means having multi-dimensional surface contouring, and an edge trimming portion therewith including a channel guide as well as movable blade means projecting therefrom for cutting sheet material during contouring thereof.

2. The combination of claim 1 wherein said channel guide has a slot to one side thereof along which said blade means is movable regardless of shape and irregular contouring.

3. The combination of claim 1 wherein a plurality of vacuum passages located to one side adjacent to said channel guide can provide localized differential pressure for curved configuration during contouring and edge trim operations.

4. The combination of claim 1 wherein said channel guide has a wavy slot pass on one side thereof and a complementary stabilizing groove with a projection on an opposite side thereof, said blade means having a force-transmitting means therewith and an extension engageable along said stabilizing groove.

5. The combination of claim 1 wherein said blade means has a motorized force-transmitting means therewith traversable through said channel guide in a closed loop configuration.

6. Procedure, comprising steps of forming sheet material into multi-dimensional configuration by use of differential pressure applied on an inexpensive forming buck adapted for passage of gaseous medium such as air therethrough, moving a cutting member along a channel guide having an irregular though predetermined path for instantaneous and continuous material edged trimming regardless of shape and irregular contours, and removing the material made to pattern without need for hard dies as well as any scissors cutting.

7. The procedure of claim 6 wherein said moving of the cutting member is manually effected using a force-transmitting drive connection thereto.

8. The procedure of claim 6 wherein said moving of the cutting member is motorized in a closed loop path for formation of crash pad covering and the like.

9. The procedure of claim 6 wherein there is a preliminary steam heating of the sheet material prior to said forming thereof and subsequent to trim moving of the cutting member.

10. The procedure of claim 6 wherein said forming occurs by vacuuming applied through passages along an underside of the channel guide.

11. Trimming equipment in combination with differential pressure forming means for sheet material, comprising, a multi-dimensional body portion for contouring and a peripheral channel portion slotted to one side thereof, a force-transmitting means extending through the channel portion, and a cutting member carried by said force transmitting means, said cutting member projecting through the slotted channel portion and being movable along a predetermined path during application of pressure differential thereby simultaneously to effect instantaneous edge trimming of the sheet material within pattern established by said slotted channel portion along the predetermined path regardless of shape and irregular curved contour.

12. The equipment of claim 11 wherein said power-transmitting means is a wiring cable having said cutter membetr carried thereon, said cable having a diameter greater than width of the slotted location of said channel portion.

13. The equipment of claim 11 wherein said power-transmitting means is a ball-chain having said cutter member carried thereon and movable by pulling force applied thereto for instantaneous trimming of sheet material edging simultaneously with differential pressure forming thereof.

14. The equipment of claim 11 wherein said power-transmitting means is a link chain movable to and fro through said channel portion which has a squared though hollow interior.

15. The equipment of claim 11 wherein said cutter member has a double edged configuration for trimming in opposite directions.

16. The equipment of claim 11 wherein said cutter member has at least one curved hook blade and a piercing barb integral therewith for initial engagement with the sheet material.

17. An edge trimming device for use during differential pressure forming of material, comprising, a channel portion slotted continuously to one side thereof in a predetermined multi-directional path, a flexible force-transmitting means confined to be movable through said channel portion in accordance with power exerted thereon, and a cutting member carried by said flexible force-transmitting means and having at least one cutting blade projecting outwardly from said slotted channel portion progressively into engagement with the material being cut.

18. Edge trimming apparatus, comprising, a base having a recess therein and plural pressure-differential aperturing in a predetermined path and communicating therethrough, an irregularly contoured buck in a predetermined pattern on said base and located to one side of the aperturing, a slotted channel-forming means along periphery of said buck also located to one side of the aperturing path, a flexible force-transmitting means traversable within said channel forming means under mechanization, and a cutting member carried by said flexible force-transmitting means, said cutting member being movable quickly and accurately for continuous edge cutting in predetermined path determined by said slotted channel-forming means from which said cutting member projects and is guided.

19. The apparatus of claim 18 wherein said channel-forming means is tubular and is embedded in a resin-sand pattern.

References Cited by the Examiner
UNITED STATES PATENTS

| | | | |
|---|---|---|---|
| 1,521,368 | 12/1924 | Hammersley | 83—926.2 |
| 2,691,797 | 10/1954 | Bertleff et al. | |
| 3,042,969 | 7/1962 | Shaul | 264—90 |

ROBERT F. WHITE, *Primary Examiner.*

A. R. NOE, *Assistant Examiner.*